March 22, 1932.    F. D. CONDIT    1,850,659
LOCKING MEANS FOR NUTS
Filed Aug. 26, 1929
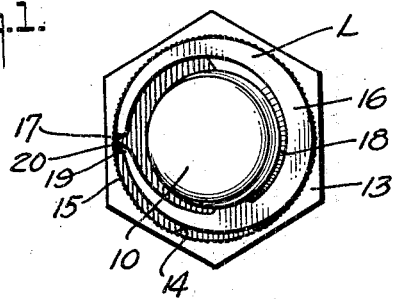
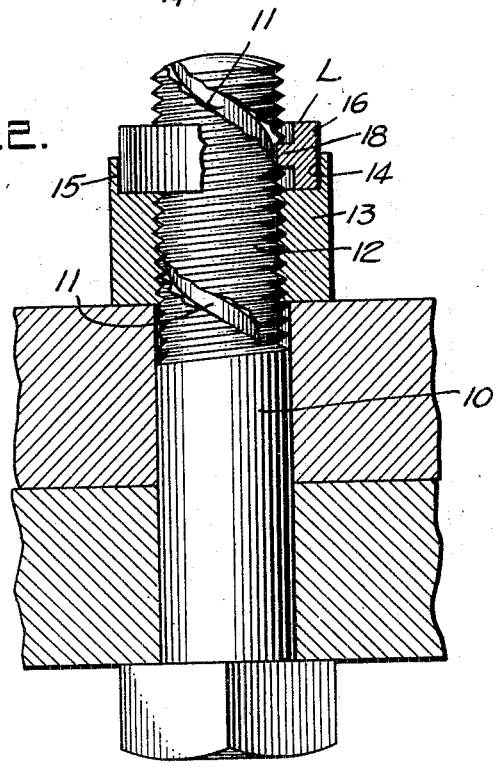
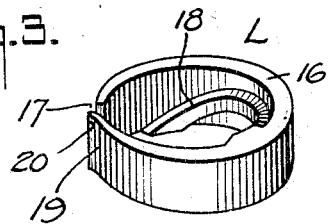
INVENTOR
FRANK D. CONDIT
BY
ATTORNEYS Patented Mar. 22, 1932

1,850,659

UNITED STATES PATENT OFFICE

FRANK D. CONDIT, OF PASADENA, CALIFORNIA

LOCKING MEANS FOR NUTS

Application filed August 26, 1929. Serial No. 388,523.

My invention relates to and has for a purpose the provision of a simple and substantial means by which a nut can be effectively locked against unscrewing movement on its bolt, and in such manner as to permit of the intentional removal of the nut from the bolt with the utmost ease and dispatch and without damaging the nut or the bolt.

I will describe only one form of locking means for nuts embodying my invention and will then point out the novel features thereof in claims.

In the accompanying drawings,

Figure 1 is a plan view of the elements shown in Figure 2, and

Figure 2 is a view showing in side elevation partly broken away, a bolt and nut with one form of locking means embodying my invention applied thereto and locking the nut against unscrewing movement on the bolt.

Figure 3 is a perspective view of a locking element embodied in my locking means.

Referring specifically to the drawings in which similar reference characters designate similar parts in each of the several views, my invention in its present embodiment is shown associated with a conventional form of bolt 10, which for the purpose of my invention is provided with a peripheral groove 11 extending from the threaded end of the bolt spirally through the threads 12 of the bolt in a direction reverse with respect to that of the threads, that is to say that in the event of the threads being right hand, the groove 11 will be left hand. A nut 13 of the proper size for screwing onto the threads 12 of the bolt 10, is provided on its outer end face with an annular recess or pocket 14, the peripheral wall of which is preferably roughened by transverse milling 15 or other suitable serrations.

For use in conjunction with the bolt and nut above described, I provide a locking element L preferably in the form of a ring 16 of resilient or spring metal, which is split transversely as indicated at 17. The inside diameter of the ring is such as to freely receive the bolt 10, and the outside diameter of the ring is such as to freely enter the recess 14 of the nut 13 so that with the ring seated in the recess as shown in Figure 2, it will partially project from the nut.

Diametrically opposite to its split 17, the ring 16 is provided internally with a projection or rib 18 which extends spirally of the ring and is slidably received in the groove 11 so as to be capable of traversing the groove in response to rotation of the ring on the bolt and thereby feed the ring onto or off of the bolt according as the ring is rotated in one direction or the other.

The ring 16 is normally expanded under its natural resiliency, a sufficient amount to render the ring of larger diameter than that of the recess 14 in the nut 13, and one extremity of the ring at its split 17 is outturned as indicated at 19 so as to be offset in a radial direction outwardly beyond the other extremity of the ring at its split so as to provide a pawl 20 adapted to co-act with the peripheral wall of the recess 14 in a manner to be described presently.

In applying the ring 16 to the bolt 10 and nut 13, the latter is first screwed on the threads 12 of the former to the degree of tightness necessary for the bolt and nut to co-act in securing two or more parts together. The ring is now applied to the free end of the bolt so that the projection 18 will enter the groove 11 of the bolt after which the ring is grasped with a suitable tool such as a pair of pliers (not shown) and contracted sufficiently to permit it to enter the recess 14 of the nut, when rotated with the tool in a direction to feed it on the bolt. When the ring has thus been rotated sufficiently to seat in the recess 14 as shown in Figure 2, it is released from the tool thus permitting the ring to expand against the peripheral wall of the recess and the pawl 20 to engage the peripheral wall.

As the groove 11 of the bolt is spiraled reversely from the threads 12 of the latter, and the groove 11 and projection 18 co-act to permit removal of the ring from the bolt only when the ring is rotated in a direction opposite to that necessary to unscrew the nut 13 from the bolt, it will be clear that any tendency or attempt to unscrew the nut from the bolt will cause the pawl 20, which presents a relatively sharp edge to the roughened peripheral wall of the recess 14, to bite into the wall and thus cause the nut to tend to feed the ring further onto the bolt, thereby positively locking the nut against unscrewing movement on the bolt.

It will be noted that in applying the ring to the recess 14, it is not necessary that the ring be rotated with the tool until seated against the bottom of the recess, as once the ring has entered the recess, the final seating of the ring in the latter can be effected by pressing upon the outer edge of the ring in a direction towards the bottom of the recess, the pawl 20 permitting the ring to rotate by the co-action of the groove 11 and projection 18, in the direction to feed the ring on the bolt, yet effectively co-acting with the peripheral wall of the recess in preventing a reverse rotation of the ring.

It will be manifest that the groove 11 and projection 18 broadly constitute a cam means co-acting with the pawl 20 and the nut 13 to prevent unscrewing movement of the latter from the bolt, and that the pawl 20 and the peripheral wall of the recess 14 broadly constitute a means which co-acts with the groove and projection to perform the same function.

When it is desired to remove the nut from the bolt, the ring is first contracted with the tool sufficiently to disengage the pawl 20 from the peripheral wall of the recess 14, after which the ring is rotated with the tool in the direction to feed it off of the bolt, until the ring clears the nut. The ring can then be removed from the bolt by hand, thus leaving the nut free for removal from the bolt in the ordinary manner.

Although I have herein shown and described only one form of locking means for nuts embodying my invention, it is to be understood that various changes and modifications may be made therein without departing from the spirit of the invention and the spirit and scope of the appended claims.

I claim:

1. In combination, a bolt having a peripheral groove spiraled reversely from the threads of the bolt, a nut threaded on the bolt, and a locking element on the bolt having a projection traversing said groove, and having a pawl disposed to bite into the nut for coaction with the groove and projection in locking the nut against unscrewing movement on the bolt.

2. In combination, a bolt having a peripheral groove spiraled reversely from the threads of the bolt, a nut threaded on the bolt, and having an annular recess therein, and a locking ring on the bolt and entering said recess of the nut, the ring having a spiral projection slidably fitting said spiral groove of the bolt, and being split, with one extremity of the ring at its split, normally urged outwardly beyond the periphery of the ring into engagement with the peripheral wall of said annular recess, and constituting a pawl coacting with said groove and projection to lock the nut against unscrewing movement on the bolt.

3. In combination, a bolt having a peripheral groove spiraled reversely from the threads of the bolt, a nut threaded on the bolt, and having an annular recess therein, and a locking ring of resilient material receiving the bolt and entering the annular recess of the nut, the ring having a spirally extending rib internally thereof, traversing said spiral groove of the nut, and the ring being split with one extremity thereof outturned and normally urged into engagement with the peripheral wall of said annular recess so as to tend to bite into the nut in response to attempted unscrewing movement of the nut and thereby co-act with said groove and rib in locking the nut against unscrewing movement on the bolt.

4. In combination, a bolt having a peripheral groove spiraled reversely from the threads of the bolt, a nut threaded on the bolt, and having an annular recess therein, and a locking ring of resilient material receiving the bolt and entering the annular recess of the nut, the ring having a spirally extending rib internally thereof, traversing said spiral groove of the nut, and the ring being split with one extremity thereof normally urged into engagement with the peripheral wall of said recess and presenting an edge to the wall so as to tend to bite into the latter in response to attempted unscrewing movement of the nut and thereby co-act with said groove and rib in locking the nut against unscrewing movement on the bolt.

5. In combination, a bolt having a peripheral groove spiraled reversely from the threads of the bolt, a nut threaded on the bolt, and having an annular recess therein, and a locking ring of resilient material receiving the bolt and entering the annular recess of the nut, the ring having a spirally extending rib internally thereof, traversing said spiral groove of the nut, and the ring being split with one extremity thereof normally urged into engagement with the peripheral wall of said recess and presenting an edge to the wall so as to tend to bite into the latter in response to attempted unscrewing movement of the nut and thereby co-act with said groove and rib in locking the nut against unscrewing movement on the bolt, said peripheral wall of the recess being roughened to facilitate the tendency of said extremity of the ring to bite thereinto.

6. In a locking device for nuts, a locking element comprising a resilient split ring having a pawl projecting outwardly therefrom and a spiral projection extending inwardly therefrom.

FRANK D. CONDIT.